Dec. 8, 1964  L. R. ALDRICH ETAL  3,159,850
SAFETY CRADLE BED FOR VEHICLE AND GENERAL USE
Filed March 5, 1962  2 Sheets-Sheet 1

INVENTORS
LEWIS R. ALDRICH
JOHN L. HOWARD
BY
*Knox & Knox*

Dec. 8, 1964   L. R. ALDRICH ETAL   3,159,850
SAFETY CRADLE BED FOR VEHICLE AND GENERAL USE
Filed March 5, 1962   2 Sheets-Sheet 2

INVENTORS
LEWIS R. ALDRICH
JOHN L. HOWARD
BY
Knox & Knox

United States Patent Office 3,159,850
Patented Dec. 8, 1964

3,159,850
SAFETY CRADLE BED FOR VEHICLE AND
GENERAL USE
Lewis R. Aldrich, San Diego, Calif., and John L. Howard,
2531 Haller St., San Diego, Calif.; said Aldrich assignor to said Howard
Filed Mar. 5, 1962, Ser. No. 177,564
4 Claims. (Cl. 5—94)

This invention relates to a cradle bed, and more particularly to one that has an extremely high safety factor when used in a vehicle, but which may be used in various ways outside of a vehicle.

Objects and Drawings

It is therefore the principal object of our invention to provide an improved cradle bed.

It is another object of our invention to provide an improved cradle bed that affords a great deal of safety to the infant in case of an emergency vehicle stop.

It is a further object of our invention to provide a safe vehicle cradle bed that may be used in many other ways.

The attainment of these objects and others will be realized from the following specification, taken in conjunction with the drawings, in which.

It is another object of this invention to provide a cradle bed wherein the supporting frame has at least a triple function, to support the bed per se, to constitute a canopy frame when raised, and to constitute a carrying handle.

Detailed Description of the Invention

Figure 1:
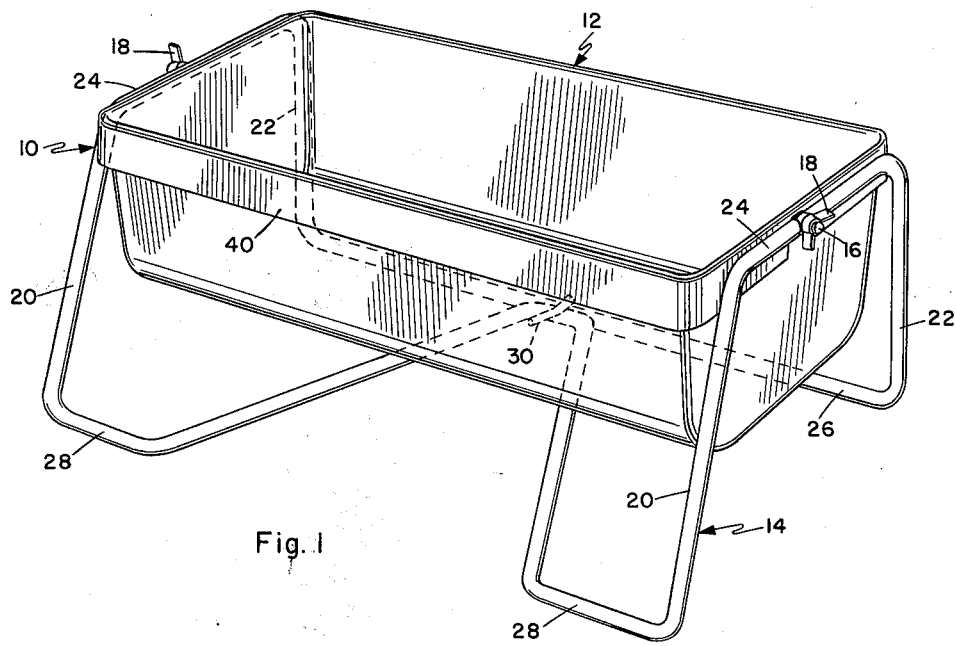
FIGURE 1 is a perspective view of the complete bed assembly.

A better understanding of our invention will be obtained from a study of the drawings, wherein like numerals refer to like or identical parts and portions throughout the views. Referring first to FIGURE 1, this shows that the cradle bed assembly 10 comprises a cradle portion 12 and a supporting frame 14.

Broadly stated, cradle portion 12 is pivotally suspended from frame 14 by means such as hinge bolts 16, which are provided with wing nuts 18. The front and rear legs 20 and 22, respectively, are as short as possible while assuring that the bottom of the cradle does not foul the frame when the cradle portion swings and that the cradle portion will not scrape an underneath supporting surface such as a car seat. This relationship gives the cradle bed assembly 10 a very low center of gravity, thus minimizing the tendency of the cradle bed assembly to tip over.

Supporting frame 14, when viewed from what will be considered the front, has a generally U-shaped form, and comprises transverse upper portions 24, legs 20 and 22, and rear and front rests 26 and 28.

Front legs 20 are preferably slanted forwardly, to provide a broader base as an additional safety factor against tipping, while the rear legs 22 are preferably vertical so that the cradle bed assembly can fit close to the back of a vehicle seat.

The rear rest 26 takes the form of a straight longitudinal member interconnecting the bottoms of the rear legs. Front rest 28, preferably takes a V-shaped configuration with the apex of the V adjacent the rear rest 26. The apex of the V is preferably attached to the rear rest for strength and an anchoring device 30 such as a forwardly extending prong is affixed to this jointure.

Figure 2:
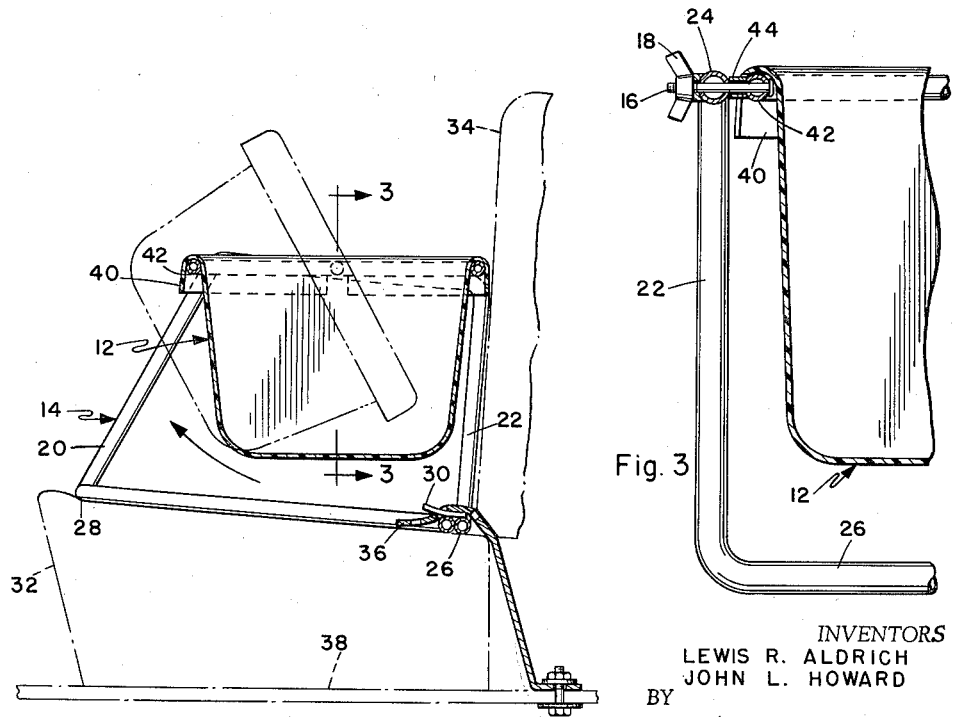
FIGURE 2 is a transverse sectional view thereof and showing the mounting in a vehicle.

In use, the cradle bed assembly 10 is placed on the vehicle's seat cushion 32 and against the back cushion 34 with rear rest 26 at the juncture of the cushions as shown in FIGURE 2. A retaining means 36, such as a chain, strap, belt or the like, has one end firmly affixed to the vehicle 38, or the base, chassis, seat, or other part thereof. The retaining means passes between the seat and back cushions, and engages the anchoring means 30. The anchoring means 30 is shown as a prong, and may be used with a chain, perforated strap, or the like. Alternatively, a buckle and belt, or other arrangement may be used.

When the vehicle is in motion, the bed 12 rocks gently on hinge bolts 16, being deterred from tipping over by the forwardly slanting front legs 20. In case of an emergency stop, supporting frame 14 is prevented from tipping over by the action of restraining means 36. This holds prong 30 and supporting frame 14 securely in position. As a result, the weight of the bed 12 and the infant therein causes the bed 12 to swing to the broken-line position of FIGURE 2. In this position of the bed, the infant's weight is still pressed against the bottom of bed 12, thus preventing the infant from being hurtled against the side of bed 12.

At the end of the emergency stop, bed 12 swings backwards, and rocks in progressively smaller arcs until it resumes its normal position.

It may thus be seen that our invention provides a vehicle cradle bed that is inherently much safer than prior-art devices of this type.

Figure 3:
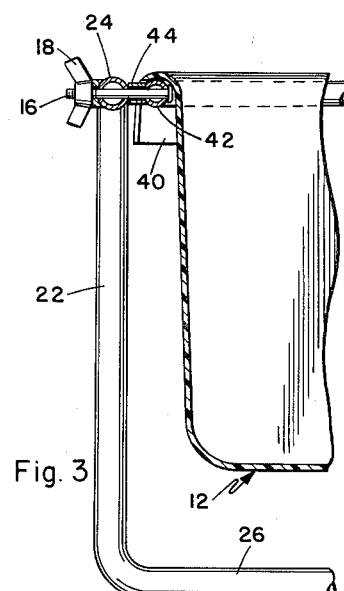
FIGURE 3 is an enlarged sectional view taken on line 3—3 of FIGURE 2.

FIGURE 3 shows one pivotal arrangement for cradle bed assembly 10. It will be seen that bed 12 has a return-folded peripheral skirt 40 that may be of inverted U-shaped cross section. This permits a rectangular mounting frame 42, which may be tubular, to fit tightly into skirt 40. Bed 12 is preferably rigid, to hold the mounting frame 42, and for another reason to be discussed later; and may be formed of plastic, pressed cardboard, wood, or the like, but fabrics may be used. As shown in FIGURE 3, hinge bolt 16 is inserted through mounting frame 42 and has a spacer 44 to provide a distributed pressure and frictional engagement between the supporting frame 10 and the skirt 40 of bed 12. The desirability of this frictional engagement will be explained in connection with a subsequent figure. Skirt 40 is slotted to receive the hinge bolt, and this structure permits the bed 12 to be lifted off mounting frame 42 for cleaning and the like. Alternatively, wing nuts 18 may be removed, and the upper portions of supporting frame 14 may be spread apart to permit removal of the hinge bolts.

Figure 5:
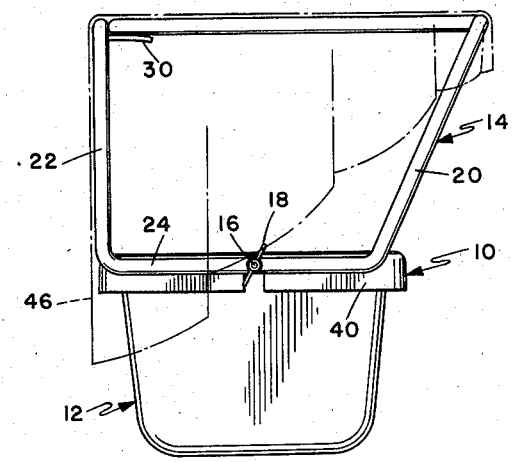
FIGURE 5 is an end elevation view showing one of the alternative uses of the supporting frame.

As previously indicated, our cradle bed can be used outside of a vehicle. For example, it may be placed on the floor, table, or other platform in the manner illustrated in FIGURE 1. It may also be used as shown in FIGURE 5, with the bed 12 placed on a support, the wing nuts 18 loosened, the supporting frame 14 elevated so that its rests are positioned above the bed 12, and wing nuts 18 then tightened. In this position, the spacers 44 provide the necessary frictional engagement to hold the elevated supporting frame upright and the rigidity of the bed prevents collapse thereof. This arrangement may be used to support a canopy 46, sunshade, mosquito netting, or the like, as shown in FIGURE 5.

Figure 4:
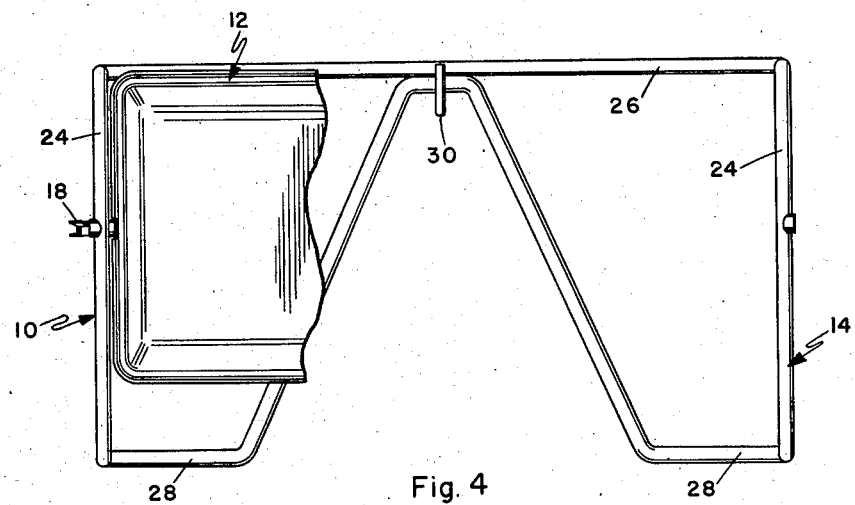
FIGURE 4 is a top plan view partially cut away.

Alternatively, this structure may be used as a bathinette, the frame 14, with the bed portion 12 fixed therein being supported on a bathroom pullman or the like. It will be noted from the top view of FIGURE 4, that the V-shaped configuration of rest 28 permits close approach to the bed, and also facilitates the removal of the infant therefrom.

Our cradle bed has still another use, namely as a carry crib. In this usage the cradle bed is arranged as in FIGURE 5, although it is not necessary to completely tighten the wing nuts 18. The adjacent parts of the rests 26 and 28 serve as a carrying handle, with the fingers straddling the prong 30. The V-shaped form permits the leg of the carrier to fit comfortably close to the cradle 12.

*Advantages*

It will be realized in recapitulation that our cradle bed has numerous advantages over prior-art devices. It is inherently more stable because of its low center of gravity and spread-apart legs. It may be strapped into a vehicle, and so prevented from tipping. The cradle portion proper swings outwardly in case of an emergency stop, thus retaining the infant safely within the cradle. Our cradle bed can be used as a bathinette, and as a carry crib; and by merely tightening a couple of wing nuts, it may be used to hold a canopy, sunshade, or mosquito netting.

It is understood that minor variation from the form of the invention discolsed herein may be made without departure from the spirit and scope of the invention, and that the specification and drawing are to be considered as merely illustrative rather than limiting.

We claim:

1. The combination comprising:
   a vehicle seat having a seat cushion and a back cushion;
   a supporting frame having upper portions, a first straight longitudinal rest, a second longitudinal rest having a V-shaped configuration, the apex of said configuration being adjacent to said first longitudinal rest, said frame being positioned on said seat cushion contiguous to said back cushion with said straight longitudinal rest contiguous to the meeting place of said seat cushion and said back cushion;
   anchoring means affixed to said supporting frame adjacent the meeting place of said apex of said configuration and said straight longitudinal rest;
   restraining means, having one end affixed to a portion of the vehicle and having a portion of said restraining means engaged to said anchoring means of said frame, for rigidly restraining said support frame from tipping over when the vehicle stops, said restraining means passing between said seat cushion and said back cushion;
   a bathtub-like cradle having a substantially rectangular upper rim;
   pivoting means, positioned at substantially the midpoint of each transverse portion of said rim, for permitting said cradle to pivot along a longitudinal axis thereof;
   pivot receiving means on each upper portion of said supporting frame, for receiving said pivoting means of said cradle; and
   means for producing frictional engagement between said upper portions of said frame and said rim of said cradle.

2. A cradle bed comprising:
   a supporting frame having upper portions, a first straight longitudinal rest, a second longitudinal rest having a V-shaped configuration, the apex of said configuration being adjacent to said first longitudinal rest, said frame fitting the seat and back cushions of a vehicle seat;
   anchoring means affixed to said supporting frame adjacent the meeting place of said apex of said configuration and said straight longitudinal rest;
   a bathtub-like cradle having a substantially rectangular upper rim;
   pivoting means, positioned at substantially the midpoint of each transverse portion of said rim, for permitting said cradle to pivot along a longitudinal axis thereof;
   pivot receiving means on each upper portion of said supporting frame, for receiving said pivoting means of said cradle; and
   means for producing frictional engagement between said upper portions of said frame and said rim of said cradle.

3. A cradle bed comprising:
   a supporting frame having two upper portions, a first straight longitudinal rest, a second rest having a V-shaped configuration, the apex of said configuration being attached to said straight rest, a pair of substantially vertical back legs interconnecting said upper portions and said straight longitudinal rest, and a pair of downwardly and outwardly slanted front legs interconnecting said upper portions and said second rest, said frame fitting the seat and back cushions of a vehicle seat;
   anchoring means, comprising a forwardly projecting anchoring prong mounted at the junction of said rests, for permitting said frame to be anchored against tipping;
   a bathtub-like cradle having a substantially rectangular upper rim;
   a pair of hinge bolts attached at substantially the mid point of the rim of said cradle;
   hinge bolt receiving means on each upper portion of said supporting frame, for permitting said cradle to pivot along a longitudinal axis thereof; and
   means, comprising a wing nut threadedly mounted on each said hinge bolt, for producing frictional engagement between said cradle and said upper portions of said frame.

4. A cradle bed comprising:
   a supporting frame having two upper portions, a first straight longitudinal rest, a second rest having a V-shaped configuration, the apex of said configuration being attached to said straight rest, a pair of substantially vertical back legs interconnecting said upper portions and said straight longitudinal rest, and a pair of downwardly and outwardly slanted front legs interconnecting said upper portions and said second rest;
   anchoring means, comprising a forwardly projecting anchoring prong mounted at the junction of said rests, for permitting said frame to be anchored against tipping;
   a bathtub-like cradle of rigid material, said cradle having a substantially rectangular upper rim;
   a return fold skirt on said rim;
   a substantially rectangular mounting frame positioned tightly between said skirt and said rim;
   a pair of hinge bolts attached at substantially the mid point of the transverse portions of said mounting frame;
   hinge bolt receiving means on each upper portion of said supporting frame, for permitting said cradle to pivot along a longitudinal axis thereof; and
   means, comprising a wing nut threadedly mounted on each said hinge bolt, for producing frictional engagement between said skirt and said upper portions of said skirt and said upper portions of said frame, whereby said rigid cradle may be placed on a support, and said supporting frame may be positioned above said cradle to support a canopy that acts as a sun shade.

References Cited in the file of this patent

UNITED STATES PATENTS

| | | |
|---|---|---|
| 1,111,927 | Stanion | Sept. 29, 1914 |
| 1,363,667 | Mahr | Dec. 28, 1920 |
| 1,530,116 | Hawkins | Mar. 17, 1925 |
| 1,574,226 | Ackermann | Feb. 23, 1926 |
| 1,629,281 | Lindsley | May 17, 1927 |
| 2,153,547 | Charlop et al. | Apr. 11, 1939 |
| 2,664,140 | Kindelberger | Dec. 29, 1953 |

FOREIGN PATENTS

| | | |
|---|---|---|
| 289,591 | Great Britain | May 3, 1928 |